(12) United States Patent
Yaginuma et al.

(10) Patent No.: US 12,088,986 B2
(45) Date of Patent: Sep. 10, 2024

(54) INPUT DEVICE

(71) Applicant: ALPS ALPINE CO., LTD., Tokyo (JP)

(72) Inventors: Sadayuki Yaginuma, Miyagi (JP); Kunio Hosono, Fukushima (JP); Tetsuo Muranaka, Miyagi (JP); Yasuji Hagiwara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 199 days.

(21) Appl. No.: 18/047,769

(22) Filed: Oct. 19, 2022

(65) Prior Publication Data

US 2023/0065480 A1 Mar. 2, 2023

Related U.S. Application Data

(63) Continuation of application No. PCT/JP2021/016213, filed on Apr. 21, 2021.

(30) Foreign Application Priority Data

May 13, 2020 (JP) ................................. 2020-084772

(51) Int. Cl.
  *H04R 1/10* (2006.01)
  *G06F 3/0338* (2013.01)
  (Continued)

(52) U.S. Cl.
  CPC ......... *H04R 1/1041* (2013.01); *G06F 3/0338* (2013.01); *G06F 3/0362* (2013.01); *G06F 3/038* (2013.01)

(58) Field of Classification Search
  CPC ... H04R 1/1041; G06F 3/0338; G06F 3/0362; G06F 3/038
  See application file for complete search history.

(56) References Cited

U.S. PATENT DOCUMENTS

2013/0051889 A1 2/2013 Kimura et al.
2019/0098390 A1* 3/2019 Carino .................. H04R 5/033

FOREIGN PATENT DOCUMENTS

JP 2005-100077 4/2005
JP 2005-100179 4/2005
(Continued)

OTHER PUBLICATIONS

International Search Report for PCT/JP2021/016213 mailed on Jul. 13, 2021.

*Primary Examiner* — Simon King
(74) *Attorney, Agent, or Firm* — IPUSA, PLLC

(57) ABSTRACT

An input device includes a housing and a strain-generating body including a cylindrical portion with an upper end surface, the strain-generating body being secured to the housing. The input device includes four strain sensors, the four strain sensors being secured around the cylindrical portion of the strain-generating body. The input device includes an operation panel having a lower surface, the operation panel including a shaft, the shaft being situated on the lower surface and at a central portion of the operation panel, and the shaft being inserted into the cylindrical portion of the strain-generating body to be secured to the strain-generating body. The upper end surface of the cylindrical portion of the strain-generating body and the lower surface of the operation panel are in contact with each other.

13 Claims, 10 Drawing Sheets

(51) Int. Cl.
　　　*G06F 3/0362* 　　(2013.01)
　　　*G06F 3/038* 　　(2013.01)

(56) References Cited

FOREIGN PATENT DOCUMENTS

| | | |
|---|---|---|
| JP | 2013-047871 | 3/2013 |
| JP | 2017-033455 | 2/2017 |

* cited by examiner

INPUT DEVICE

CROSS-REFERENCE TO RELATED APPLICATIONS

This application is a continuation application of International Application No. PCT/JP2021/016213, filed on Apr. 21, 2021, and designated the U.S., which is based upon and claims priority to Japanese Patent Application No. 2020-084772, filed on May 13, 2020, the entire contents of which are incorporated herein by reference.

BACKGROUND

1. Field of the Invention

The present disclosure relates to an input device.

2. Description of the Related Art

Patent Document 1 below discloses an input device. In the input device, a detector that includes a strain detection sensor, as well as an operation protrusion, are integrally formed in a resin formation body, and an elastic cap is attached to the operation protrusion. The input device disclosed in Patent Document 1 employs a configuration in which an inner peripheral surface of a cavity in the elastic cap and an outer peripheral surface of the operation protrusion are in contact with each other.

RELATED-ART DOCUMENT

Patent Document

[Patent Document 1] Japanese Unexamined Patent Application Publication No. 2017-033455

However, the input device disclosed in Patent Document 1 is designed on the premise that the elastic cap is operated horizontally through an operator's finger. With this arrangement, in the input device in Patent Document 1, pressing operations against the elastic cap cannot be performed in each of multiple operational directions.

An input device according to one embodiment includes a housing and a strain-generating body including a cylindrical portion with an upper end surface, the strain-generating body being secured to the housing. The input device includes four strain sensors, the four strain sensors being secured around the cylindrical portion of the strain-generating body. The input device includes an operation panel having a lower surface, the operation panel including a shaft, the shaft being situated on the lower surface and at a central portion of the operation panel, and the shaft being inserted into the cylindrical portion of the strain-generating body to be secured to the strain-generating body. The upper end surface of the cylindrical portion of the strain-generating body and the lower surface of the operation panel are in contact with each other.

DESCRIPTION OF THE EMBODIMENTS

One embodiment will be described. The configuration of an earpiece 100 according to one embodiment will be described below with reference to FIGS. 1 to 4.

(Outline of Earpiece 100)

Figure 1:
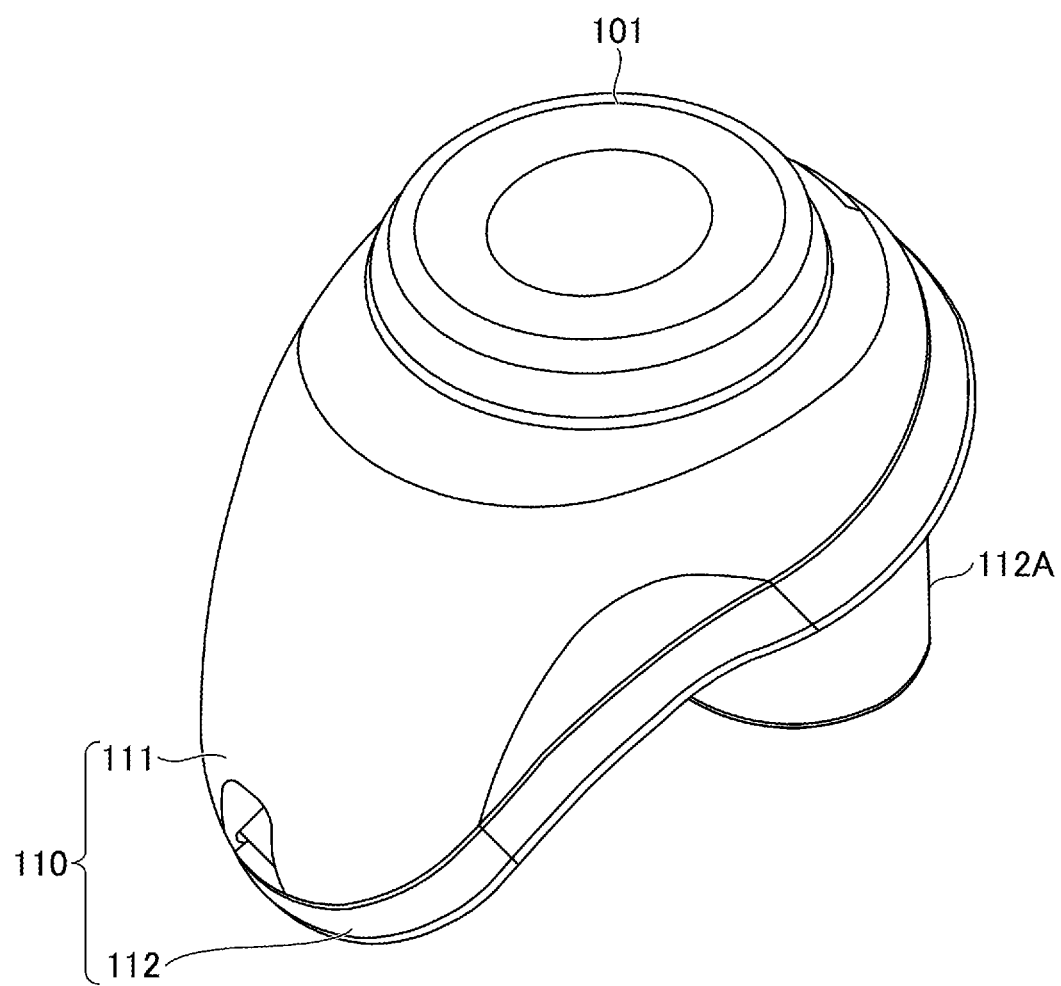
FIG. 1 is an external perspective view of an earpiece according to one embodiment.

FIG. 1 is an external perspective view of the earpiece 100 according to one embodiment. The earpiece 100 illustrated in FIG. 1 is a device to be worn on an ear of a user. The earpiece 100 incorporates a speaker 151 (see FIG. 5), and can output sound via the speaker 151. The earpiece 100 can perform wireless communication with an external device 10 (see FIG. 5) by a predetermined wireless communication system (for example, Bluetooth (registered trademark)). For example, the earpiece 100 receives music reproduced by an application 12 (see FIG. 5) (for example, a music reproduction application) in the external device 10 (see FIG. 5) (for example, a smartphone, a music player, or the like), outputs the music via the speaker 151, and then can propagate the music to the inside of the ear of the user.

As illustrated in FIG. 1, the earpiece 100 includes a housing 110 and an operation panel 101.

The housing 110 is a member serving as a base material of the earpiece 100. The housing 110 has a hollow structure. The housing 110 is constituted by combining an upper case 111 and a lower case 112 with each other. The housing 110 is formed using a resin material. A circuit board 105 is provided in the interior of the housing 110. The lower case 112 has a cylindrical portion 112A that protrudes downward. The cylindrical portion 112A is a portion to be inserted into the inside of the ear of the user. The sound output via the speaker 151, which is provided in the circuit board 105, is propagated to the inside of the ear of the user, within the cylindrical portion 112A.

The operation panel 101 is a disc-shaped member provided on the upper surface of the upper case 111. The operation panel 101 is a portion where the user operates the earpiece 100. The operation panel 101 is formed using a resin material. With use of the earpiece 100 according to the present embodiment, user operations through the operation panel 101 can include a pressing operation, a tap operation, a tracking operation, and the like.

For example, the user can perform the pressing operation through the operation panel 101 to cause the application 12 of the external device 10 to perform a playback operation and a pause operation of music.

For example, the user can also perform the tap operation through the operation panel 101 to cause the application 12 of the external device 10 to perform a fast forward operation and a fast playback operation of music.

For example, the user can further perform the tracing operation (rotation operation) through the operation panel 101 to cause the application 12 of the external device 10 to perform an operation of increasing or decreasing a music volume.

(Configuration of Earpiece 100)

Figure 2:
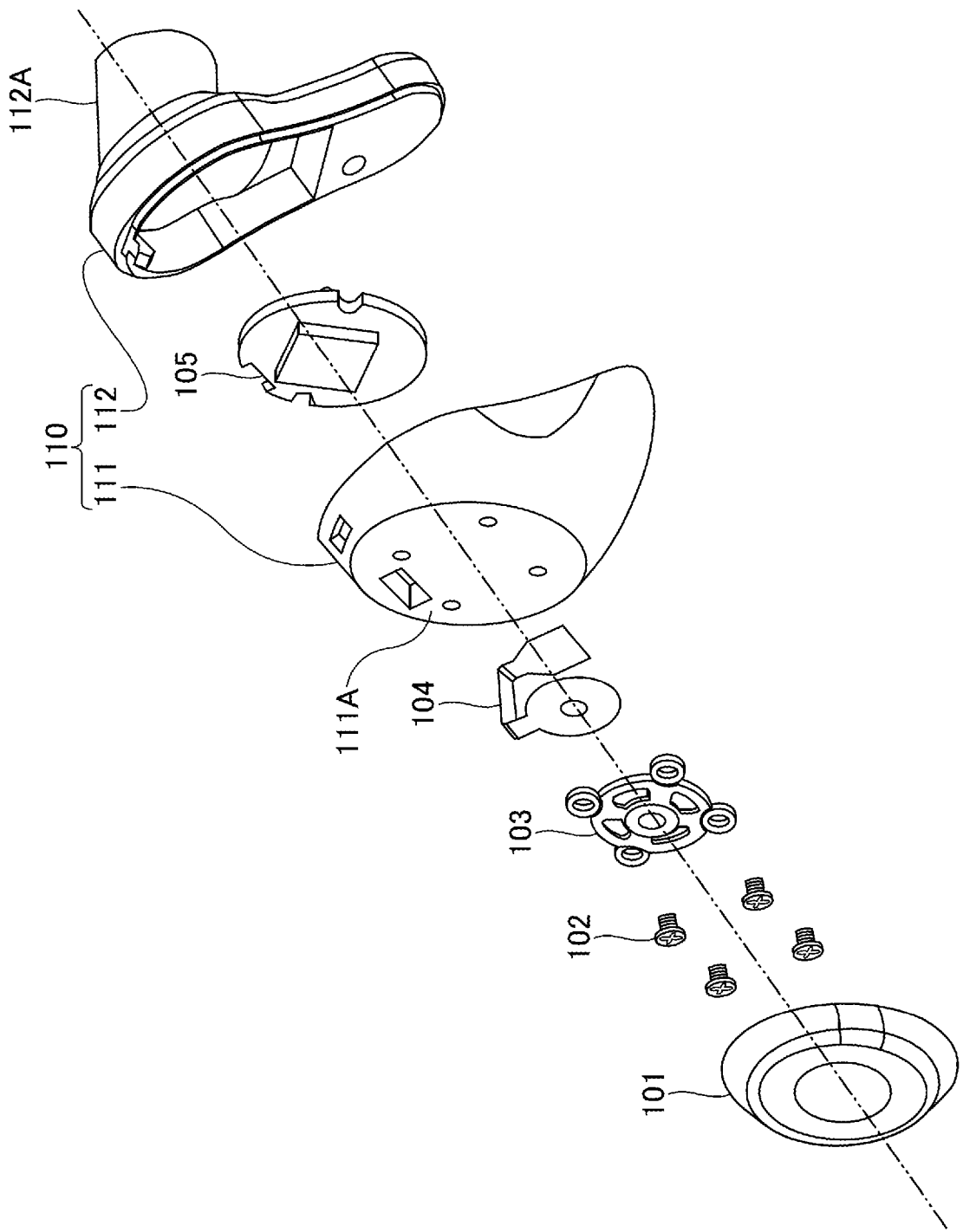
FIG. 2 is an exploded perspective view of the earpiece according to one embodiment.
Figure 3:
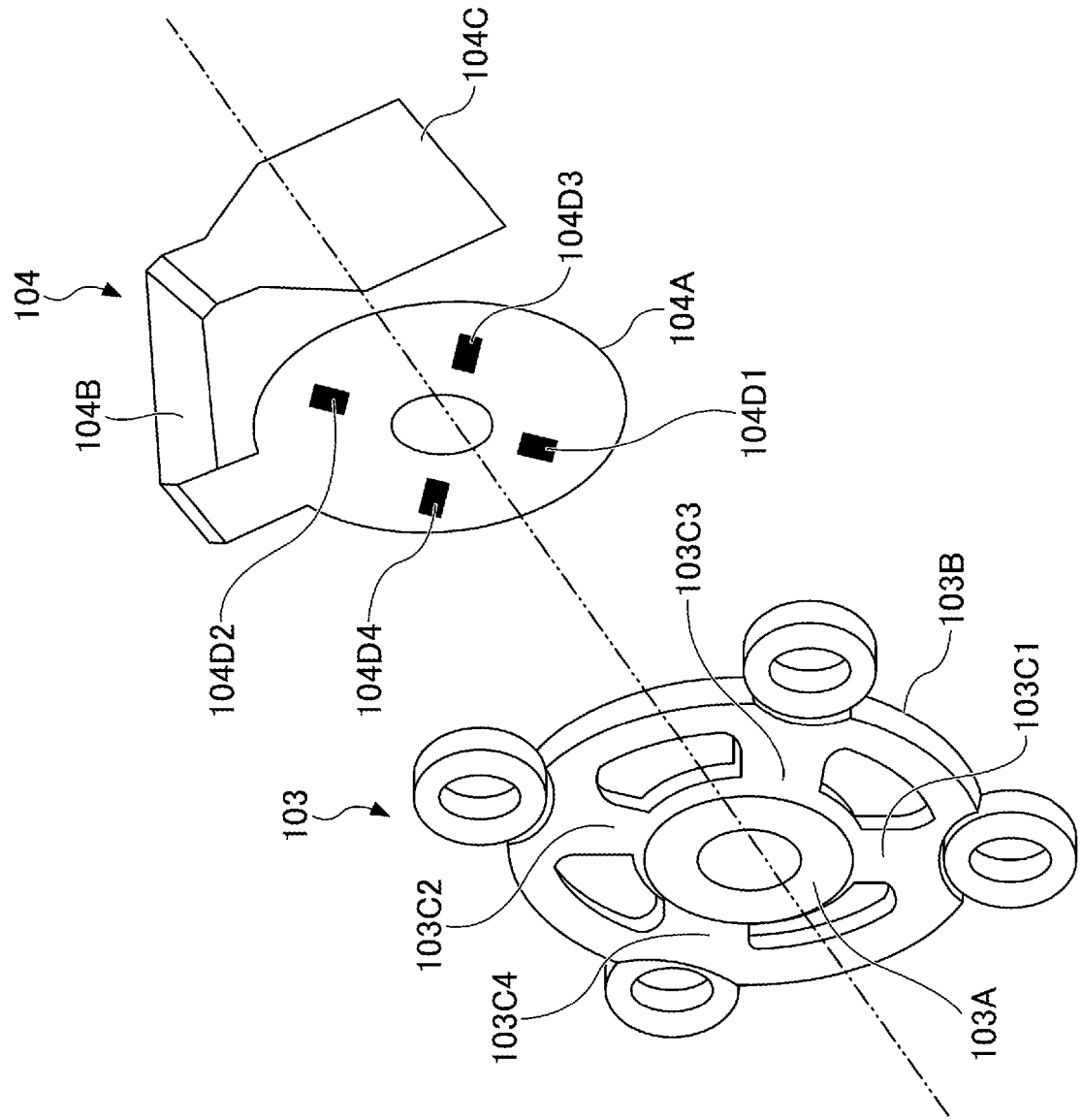
FIG. 3 is an enlarged view of a strain-generating body and a FPC as illustrated in FIG. 2.

FIG. 2 is an exploded perspective view of the earpiece 100 according to one embodiment. FIG. 3 is an enlarged view of a strain-generating body 103 and a flexible printed circuit (FPC) 104 illustrated in FIG. 2. As illustrated in FIG. 2, the earpiece 100 includes the operation panel 101, four screws 102, the strain-generating body 103, the FPC 104, the upper case 111, the circuit board 105, and the lower case 112 that are disposed in this order from an upper side (i.e., positive Z-axis side).

The strain-generating body 103 is a planar member secured to both a shaft 101B (see FIG. 4) of the operation panel 101 and an upper surface 111A of the upper case 111. As illustrated in FIG. 3, the strain-generating body 103 includes a cylindrical portion 103A, an outer peripheral portion 103B, and four beams 103C1, 103C2, 103C3, and 103C4.

The cylindrical portion 103A is a cylindrical portion provided at a central portion of the strain-generating body 103. The shaft 101B of the operation panel 101, which is cylindrical, is inserted into the interior of the cylindrical portion 103A, and thus the shaft 101B is press-fit onto the cylindrical portion 103A. With this arrangement, the operation panel 101 tightly fits the cylindrical portion 103A of the strain-generating body 103 so as not to easily fall off from the cylindrical portion 103A of the strain-generating body 103.

The outer peripheral portion 103B is an annular portion that surrounds the cylindrical portion 103A. The strain-generating body 103 is secured, at the outer peripheral portion 103B, to the upper surface 111A of the upper case 111, with the four screws 102.

Each of the four beams 103C1, 103C2, 103C3, and 103C4 is a portion that connects the cylindrical portion 103A with the outer peripheral portion 103B, when viewed in a corresponding direction among respective four directions. Specifically, the beam 103C1 extends from the cylindrical portion 103A in a first radial direction and is connected to the outer peripheral portion 103B. The beam 103C2 extends from the cylindrical portion 103A in a second radial direction opposite to the first radial direction and is connected to the outer peripheral portion 103B. The beam 103C3 extends from the cylindrical portion 103A in a third radial direction perpendicular to both the first radial direction and the second radial direction, and is connected to the outer peripheral portion 103B. The beam 103C4 extends from the cylindrical portion 103A in a fourth radial direction opposite to the third radial direction and is connected to the outer peripheral portion 103B. When the user operation of the operation panel 101 is performed, strains are concentrated in the four beams 103C1, 103C2, 103C3, and 103C4 of the strain-generating body 103.

The FPC 104 is a flexible, film-like line member. As illustrated in FIG. 3, the FPC 104 includes a base 104A, a drawn-out portion 104B, and a connection portion 104C. The base 104A is an annular portion secured to a lower surface (i.e., negative Z-axis surface) of the strain-generating body 103. As illustrated in FIG. 3, four strain sensors 104D1, 104D2, 104D3, and 104D4 are respectively disposed at locations of the base 104A corresponding to the four beams 103C1, 103C2, 103C3, and 103C4. When a user operation of the operation panel 101 is performed, a resistance value of each of the four strain sensors 104D1, 104D2, 104D3, and 104D4 changes in accordance with strain that is generated in a corresponding beam among the four beams 103C1, 103C2, 103C3, and 103C4 of the strain-generating body 103. With this arrangement, each of the four strain sensors 104D1, 104D2, 104D3, and 104D4 detects the strain generated in a corresponding beam among the four beams 103C1, 103C2, 103C3, and 103C4. The drawn-out portion 104B is a portion that is drawn from the base 104A, penetrates the upper case 111, and extends within the housing 110. The connection portion 104C is provided at a distal end of the drawn-out portion 104B and is a portion connected to the circuit board 105. The FPC 104 transmits detected strain values, which are respectively output from the four strain sensors 104D1, 104D2, 104D3, and 104D4, to the circuit board 105. The strain-generating body 103 may have a disk shape without having any holes. As long as the strain-generating body 103 includes at least four strain sensors 104D1, 104D2, 104D3 that are disposed around the cylindrical portion 103A, the strain-generating body 103 allows the pressing operation against the operation panel to be detected in each of multiple operational directions.

The circuit board 105 is a planar member that is fixedly provided within the housing 110. A control circuit 150 (see FIG. 5) is provided in the circuit board 105. As the circuit board 105, for example, a printed wiring board (PWB) is used.

With this arrangement, in the earpiece 100 according to one embodiment, when the user operation is performed through the operation panel 101, and thus a load is applied to the operation panel 101, strain occurs in each of the four beams 103C1, 103C2, 103C3, and 103C4 in the strain-generating body 103 to which the operation panel 101 is secured, and the strain is generated in accordance with (i) a direction in which the load is applied and (ii) the magnitude of the load. With this arrangement, each of the four strain sensors 104D1, 104D2, 104D3, and 104D4 detects the strain in a corresponding beam among the four beams 103C1, 103C2, 103C3, and 103C4. A detected strain value is output, via the FPC 104, from each of the four strain sensors 104D1, 104D2, 104D3, and 104D4 to the control circuit 150 provided in the circuit board 105. The control circuit 150 can determine an operational direction and a load magnitude, based on the detected strain value by each strain sensor, and the operational direction is a direction in which the user operation is performed through the operation panel 101, and the load magnitude is a magnitude of the load that is applied to the operation panel 101 through the user operation.

Figure 4:
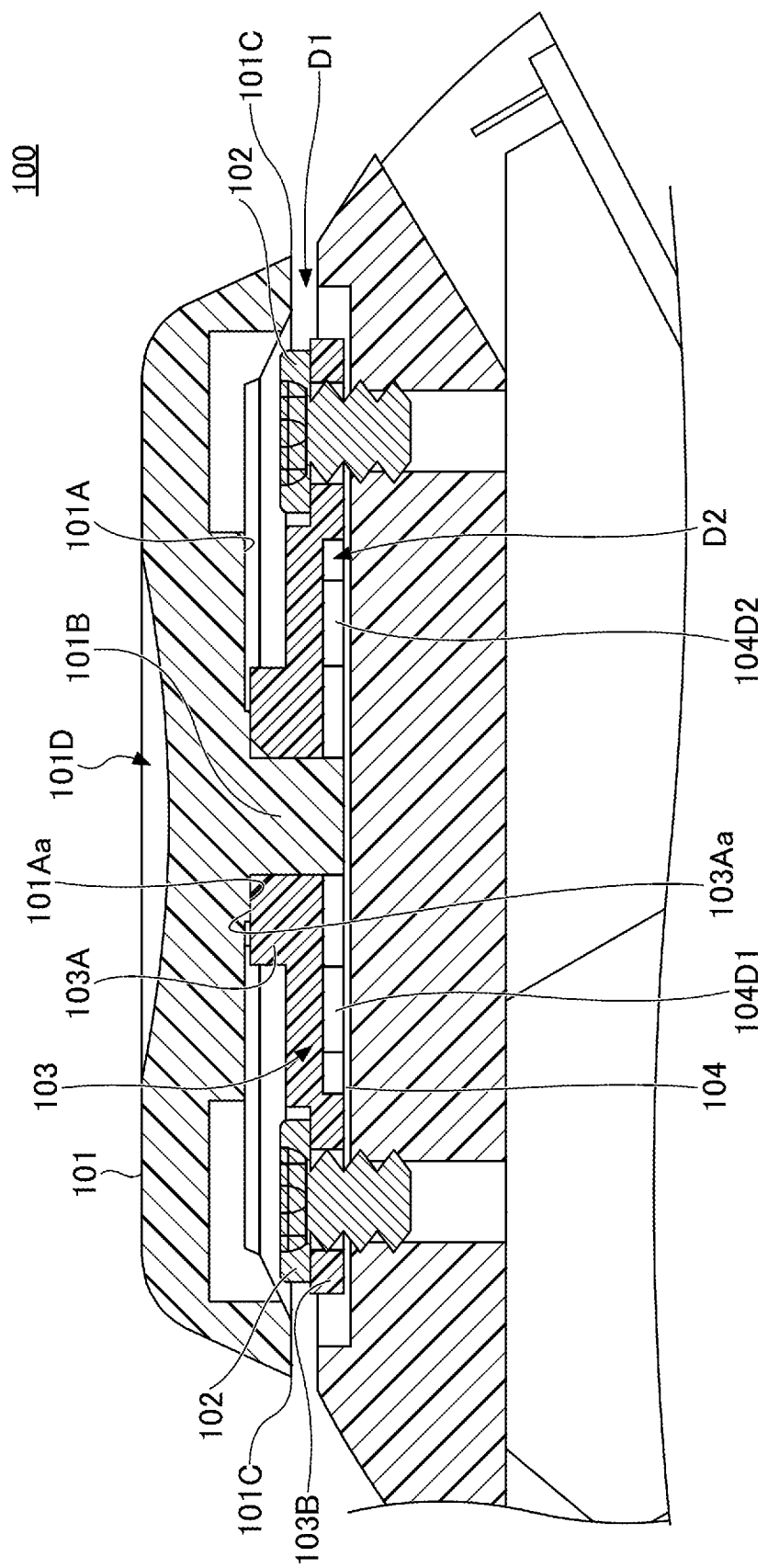
FIG. 4 is a cross-sectional view of the earpiece according to one embodiment.

FIG. 4 is a cross-sectional view of the earpiece 100 according to one embodiment.

As illustrated in FIG. 4, in the earpiece 100 according to one embodiment, the cylindrical shaft 101B is provided at a central portion of a lower surface 101A of the operation panel 101. In the earpiece 100 according to one embodiment, the shaft 101B of the operation panel 101 fits into the interior of the cylindrical portion 103A of the strain-generating body 103. Also, in the earpiece 100 according to one embodiment, an upper end surface 103Aa of the cylindrical portion 103A in the strain-generating body 103 and the lower surface 101A of the operation panel 101 are in contact with each other.

With this arrangement, in the earpiece 100 according to one embodiment, by fitting the shaft 101B of the operation panel 101 into the interior of the cylindrical portion 103A of the strain-generating body 103, the operation panel 101 is secured to the strain-generating body 103. Thus, strain can occur in the strain-generating body 103, in response to the user operation through the operation panel 101.

In the earpiece 100 according to one embodiment, the upper end surface 103Aa of the cylindrical portion 103A in the strain-generating body 103 and the lower surface 101A of the operation panel 101 are in contact with each other. With this arrangement, when the pressing operation against the operation panel 101 is performed in any operational direction, a given beam, corresponding to the operational direction, among the four beams 103C1 to 103C4, can be reliably distorted. Thus, a given direction in which the pressing operation is performed can be detected with high accuracy.

Further, in the earpiece 100 according to one embodiment, the upper end surface 103Aa of the cylindrical portion 103A in the strain-generating body 103 and the lower surface 101A of the operation panel 101 are in contact with each other. With this arrangement, when the pressing operation against the central portion of the operation panel 101 is performed, the four beams 103C1 to 103C4 can be uniformly distorted. Thus, the pressing operation can be detected with high accuracy.

In particular, in the earpiece 100 according to one embodiment, as illustrated in FIG. 4, the lower surface 101A of the operation panel 101 has a contact surface 101Aa, and the contact surface 101Aa of the operation panel 101 contacts the upper end surface 103A of the cylindrical portion 103Aa in the strain-generating body 103. The contact surface 101Aa has an annular shape that surrounds the shaft 101B, and is offset relative to the lower surface 101A toward the strain-generating body 103. That is, in the earpiece 100 according to one embodiment, the thickness around the shaft 101B in the operation panel 101 is partially increased. As illustrated in FIG. 4, the shaft 101B in the operation panel 101 tightly fits the cylindrical portion 103A of the strain-generating body 103. Further, as illustrated in FIG. 4, an outer diameter of the contact surface 101Aa in the operation panel 101 is less than an outer diameter of the upper end surface 103A of the cylindrical portion 103Aa in the strain-generating body 103.

With this arrangement, in the earpiece 100 according to one embodiment, strength of the operation panel 101 around the shaft 101B can be increased, and an operational load applied to the operation panel 101 can be concentrated at the cylindrical portion 103A of the strain-generating body 103. Thus, the earpiece 100 according to one embodiment can more reliably transmit the operational load applied to the operation panel 101 to the strain-generating body 103, thereby enabling the user operation to be detected with higher accuracy.

As illustrated in FIG. 4, in the earpiece 100 according to one embodiment, a space D1 is provided between an outer peripheral edge 101C of the operation panel 101 and the upper case 111. The outer peripheral edge 101C of the operation panel 101 can come into contact with the upper case 111, when the operation panel 101 is elastically deformed.

With this arrangement, in the earpiece 100 according to one embodiment, when the outer peripheral edge 101C of the operation panel 101 comes into contact with the upper case 111, the operation panel 101 is not further deformed. Thus, the operation panel 101 can be prevented from being plastically deformed.

In the earpiece 100 according to one embodiment, when the outer peripheral edge 101C of the operation panel 101 comes into contact with the upper case 111, the operation panel 101 is not further deformed. Thus, an operation feeling can be provided to the user based on rapid changes in the operational load.

In the earpiece 100 according to one embodiment, as illustrated in FIG. 4, the thickness of the shaft 101B of the operation panel 101 stays constant.

With this arrangement, in the earpiece 100 according to one embodiment, when the operation panel 101 is replaced with a new operation panel 101, operation panels 101 can be easily attached to and detached from the cylindrical portion 103A in the strain-generating body 103.

In the earpiece 100 according to one embodiment, as illustrated in FIG. 3, the strain-generating body 103 includes the annular outer peripheral portion 103B, and the outer peripheral portion 103B and the cylindrical portion 103A are coupled to each other by the four beams 103C1, 103C2, 103C3, and 103C4. In the earpiece 100 according to one embodiment, the strain-generating body 103 is screwed and secured, at the outer peripheral portion 103B, to the upper case 111. Further, in the earpiece 100 according to one embodiment, as illustrated in FIG. 4, a space D2 is provided between the upper case 111 and the strain-generating body 103 at the cylindrical portion 103A and the four beams 103C1, 103C2, 103C3, and 103C4.

With this arrangement, in the earpiece 100 according to one embodiment, the strain-generating body 103 can be firmly secured to the upper case 111, and strain can be easily generated in each of the four beams 103C1, 103C2, 103C3, and 103C4.

In the earpiece 100 according to one embodiment, the four strain sensors 104D1 to 104D4 are provided in the FPC 104 (which is an example of a "flexible line board"), and are respectively secured to the four beams 103C1, 103C2, 103C3, and 103C4, while being secured to the FPC 104.

With this arrangement, in the earpiece 100 according to one embodiment, the four strain sensors 104D1 to 104D4 can be more easily installed, and accuracy in installing the strain sensors 104D1 to 104D4 can be increased.

In the earpiece 100 according to one embodiment, as illustrated in FIG. 4, the operation panel 101 has a recess 101D at the upper surface and at the central portion of the operation panel.

With this arrangement, the earpiece 100 according to one embodiment can increase operability of the user operation with respect to the outer peripheral portion (that is, a portion around the recess 101D) at the upper surface of the operation panel 101.

In the present embodiment, each component of the above input device is applied to the earpiece 100. With this arrangement, in comparison to a conventional earpiece including an input device as an electrostatic input device, such as a touch pad, the earpiece 100 according to one embodiment can suppress (i) malfunctions due to non-contact of a user's finger, or (ii) malfunctions or the like due to contact with user's hair or the like. Thus, the user operation can be detected with high accuracy.

The control performed by the earpiece 100 will be described below with reference to FIGS. 5 to 9.

(Configuration of Earpiece 100)

Figure 5:
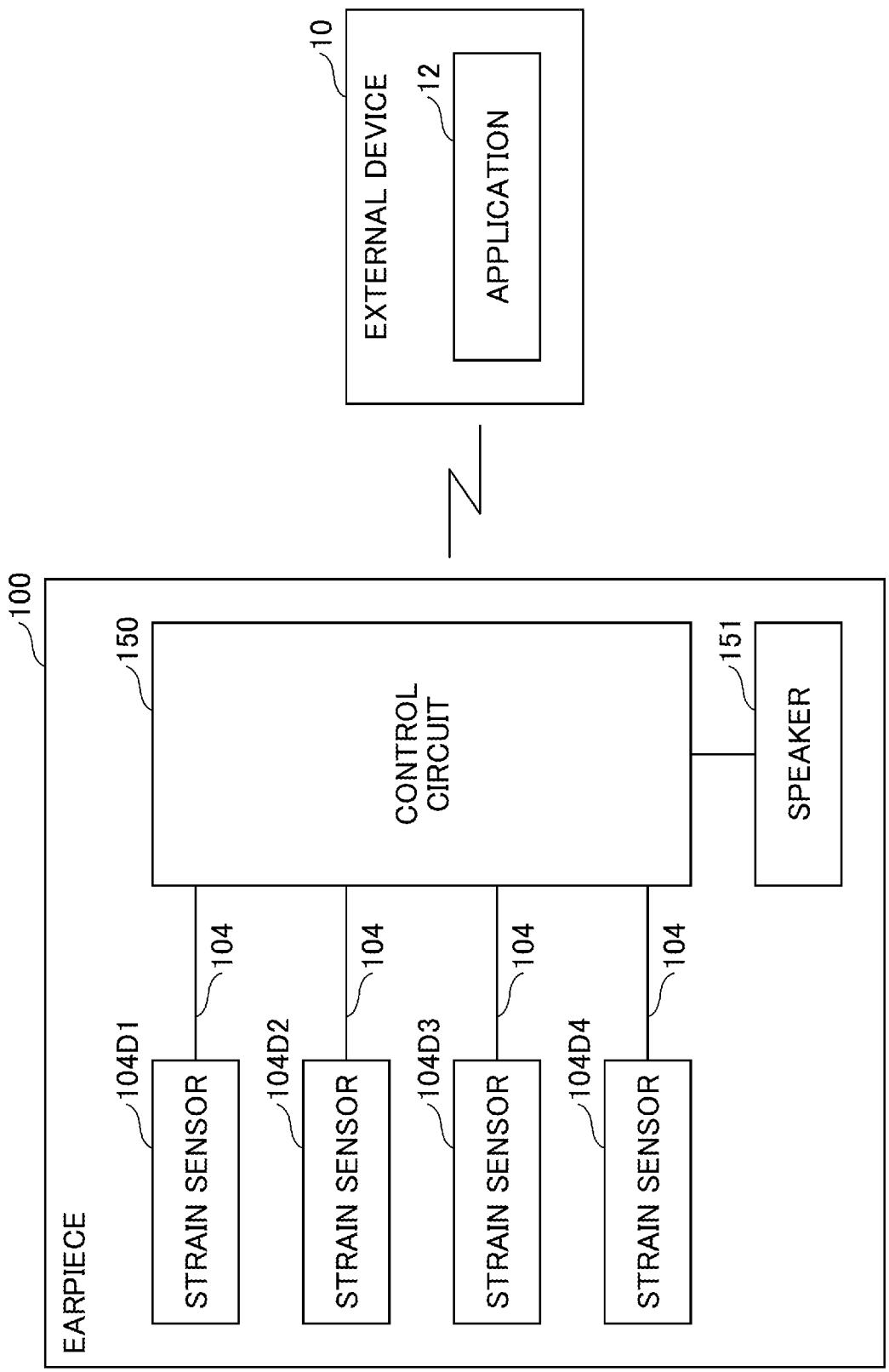
FIG. 5 is a block diagram illustrating an electrical configuration example of the earpiece according to one embodiment.

FIG. 5 is a block diagram illustrating an electrical configuration of the earpiece 100 according to one embodiment. As illustrated in FIG. 5, the earpiece 100 includes the control circuit 150 and the speaker 151, in addition to the four strain sensors 104D1, 104D2, 104D3, and 104D4.

The control circuit 150 is an example of a controller. The control circuit 150 is provided in the circuit board 105. The control circuit 150 is connected to the strain sensors 104D1, 104D2, 104D3, and 104D4, via the FPC 104. The control circuit 150 acquires detected strain values that are respectively output, via the FPC 104, from the strain sensors 104D1, 104D2, 104D3, and 104D4.

The control circuit 150 executes various processes based on the acquired detected strain values. For example, the control circuit 150 determines the user operation based on the acquired detected strain values. Then, the control circuit 150 transmits a determination result for the user operation, to the application 12 in the external device 10 through wireless communication.

For example, the control circuit 150 can also supply an audio signal to the speaker 151 to cause sound to be output via the speaker 151. For example, the control circuit 150 can supply, to the speaker 151, the audio signal that is received from the application 12 of the external device 10 through wireless communication, to thereby cause sound reproduced by the application 12 to be output via the speaker 151.

The control circuit 150 includes, for example, an analog-to-digital (A-D) converter, an amplifier, an integrated circuit (IC), a microcomputer, a wireless communication module, a battery, and the like.

The speaker 151 is provided in the circuit board 105. The speaker 151 outputs sound by operating based on an audio signal supplied from the control circuit 150. The sound output via the speaker 151 is propagated to the inside of the ear of the user, via the cylindrical portion 112A (see FIGS. 1 and 2) of the lower case 112.

(First Example of Process by Control Circuit 150)

Figure 6:
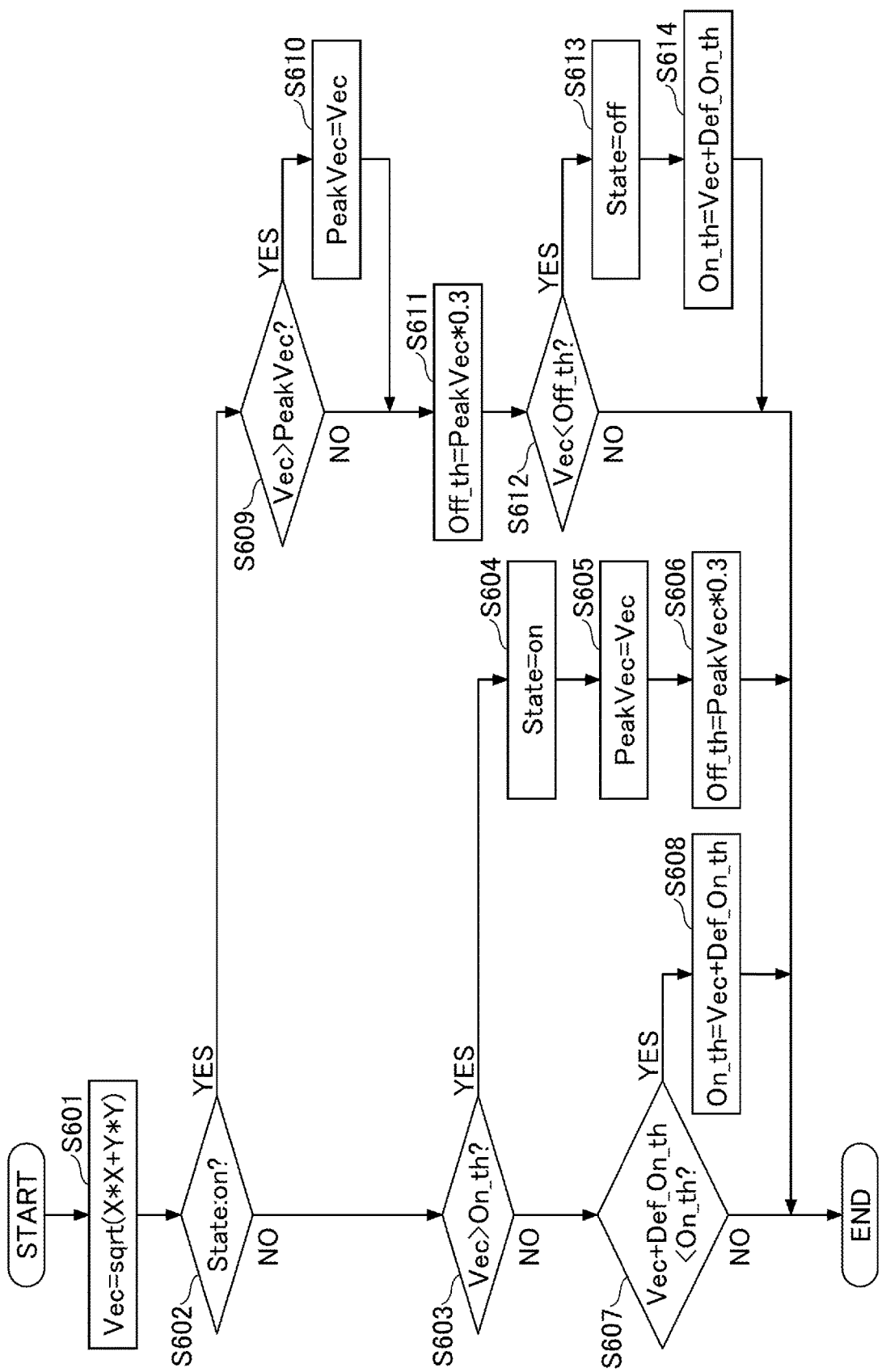
FIG. 6 is a flowchart illustrating a first process example by a control circuit according to one embodiment.

FIG. 6 is a flowchart illustrating a first process example of the process performed by the control circuit 150 according to one embodiment. In the first process example, the control circuit 150 determines that the user operation is on (i.e., pressing of the operation panel 101) or off (i.e., release of the pressed operation panel 101), and wirelessly transmits a determination result for the user operation, to the application 12 of the external device 10. The application 12 of the external device 10 determines that a tap operation is performed based on the determination result that is received from the earpiece 100. Then, the external device 10 controls the application 12 based on the determination result for the tap operation.

The control circuit 150 determines Vec by Equation $\{sqrt(X*X+Y*Y)\}$ or Equation $\{sqrt(X*X+Y*Y+Z*Z)\}$ (step S601). Vec indicates a vector of a given strain amount in the strain-generating body 103. Each of X and Y is a detected strain value by a given strain sensor, among the four strain sensors 104D1, 104D2, 104D3, and 104D4.

Then, the control circuit 150 determines whether State is on (step S602). State may indicate any one of two values indicating on and off, respectively. The "on" indicates a state in which the operation panel 101 is pressed. The "off" indicates a state in which the operation panel 101 is not pressed. With this arrangement, an initial value of State indicates off.

In step S602, if it is determined that State is not on (NO in step S602), the control circuit 150 proceeds to step S603. In contrast, if it is determined in step S602 that State is on (YES in step S602), the control circuit 150 proceeds to step S609.

In step S603, the control circuit 150 determines whether to satisfy the condition {Vec>On_th}. On_th is an on threshold that is used to determine whether the operation panel 101 is pressed, and is set to a relatively small value.

In step S603, if it is determined that the condition {Vec>On_th} is satisfied (YES in step S603), the control circuit 150 determines that the operation panel 101 is pressed, transmits a determination result for the operation panel 101 to the external device 10, and assigns on to State (step S604). The control circuit 150 also assigns Vec to PeakVec (step S605). PeakVec is a peak value of Vec. Further, the control circuit 150 assigns PeakVec*0.3 to Off_th (step S606). Off_th is an off threshold that is used to determine whether the pressed operation panel 101 is released. Then, the control circuit 150 terminates a series of processes illustrated in FIG. 6.

In contrast, if it is determined in step S603 that the condition {Vec>On_th} is not satisfied (NO in step S603), the control circuit 150 determines whether to satisfy the condition {Vec+Def_On_th<On_th} (step S607).

If it is determined in step S607 that the condition (Vec+Def_On_th<On_th) is satisfied (YES in step S607), the control circuit 150 assigns Vec+Def_On_th to On_th (step S608), and then terminates the series of processes illustrated in FIG. 6. Def_On_th is a constant.

In step S607, if it is determined that the condition {Vec+Def_On_th<On_th) is not satisfied (NO in step S607), the control circuit 150 terminates the series of processes illustrated in FIG. 6.

In step S609, the control circuit 150 determines whether to satisfy the condition {Vec>PeakVec}.

If it is determined in step S609 that the condition {Vec>PeakVec} is satisfied (YES in step S609, the control circuit 150 assigns Vec to PeakVec (step S610). Then, the control circuit 150 proceeds to step S611.

In step S609, if it is determined that the condition {Vec>PeakVec} is not satisfied (NO in step S609), the control circuit 150 proceeds to step S611.

In step S611, the control circuit 150 assigns PeakVec*0.3 to Off_th (step S611). Then, the control circuit 150 determines whether to satisfy the condition {Vec<Off_th} (step S612).

In step S612, if it is determined that the condition {Vec<Off_th} is satisfied (YES in step S612), the control circuit 150 determines that the pressed operation panel 101 is released, transmits a determination result for the operation panel 101 to the external device 10, and then assigns off to State (step S613). Further, the control circuit 150 assigns Vec+Def_On_th to On_th (step S614). Then, the control circuit 150 terminates the series of processes illustrated in FIG. 6.

In step S612, if it is determined that the condition {Vec<Off_th} is not satisfied (No in step S612), the control circuit 150 terminates the series of processes illustrated in FIG. 6.

According to the series of processes illustrated in FIG. 6, after the on timing at which the operation panel 101 is pressed is detected, the control circuit 150 determines, as an off threshold (Off_th), a value obtained by multiplying the peak value (PeakVec) of the vector of the strain amount in the strain-generating body 103, by a predetermined coefficient (i.e., 0.3), and detects a timing at which the vector (Vec) of the strain amount in the strain-generating body 103 is below the off threshold (Off_th), as the off timing at which the pressed operation panel 101 is released.

With this arrangement, the earpiece 100 according to one embodiment can detect the off timing at which the pressed operation panel 101 is released, at a timing that is earlier than a timing at which the vector of the strain amount in the strain-generating body 103 becomes 0 after the pressed operation panel 101 is actually released. Thus, in the earpiece 100 according to one embodiment, each of multiple pressing operations (tap operations) that are continuously performed during a short time period can be more reliably detected.

In the example illustrated in FIG. 6, although a predetermined coefficient is set to 0.3, it is not limited thereto. The predetermined coefficient is preferably in the range of 0.3 to 0.4.

(Second Example of Process by Control Circuit 150)

Figure 7:
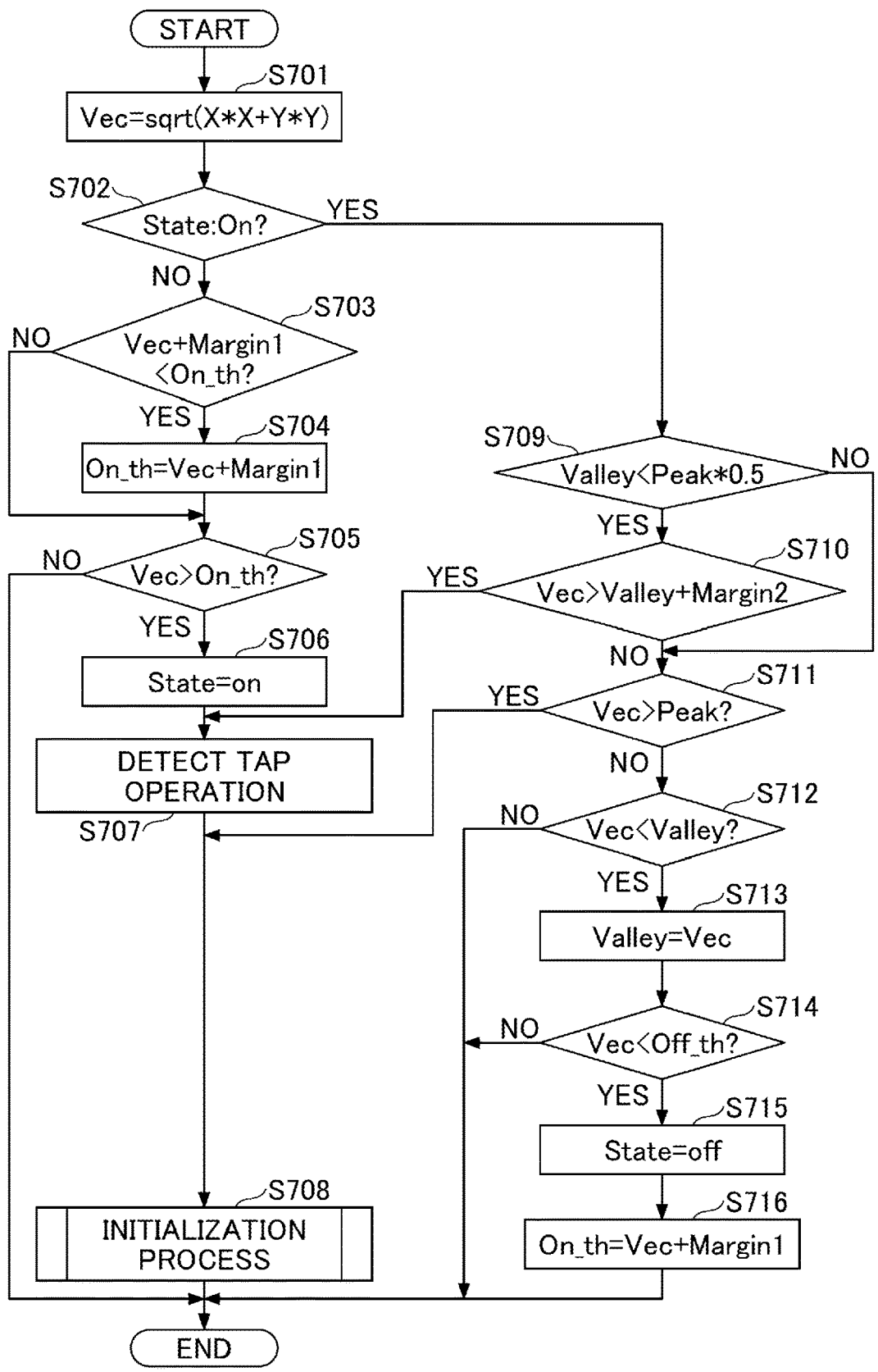
FIG. 7 is a flowchart illustrating a second process example by the control circuit according to one embodiment.

FIG. 7 is a flowchart illustrating a second process example by the control circuit 150 according to one embodiment. In the second process example, the control circuit 150 determines that the user operation is on (i.e., pressing of the operation panel 101) or off (i.e., release of the pressed operation panel 101), and determines a tap operation (which corresponds to multiple pressing operations that are continuously performed during a short time period) based on a determination result for the user operation. Then, the control circuit 150 wirelessly transmits the determination result for the tap operation to the application 12 of the external device 10. The control circuit 150 controls the operation of the application 12, based on the determination result for the tap operation that is received from the earpiece 100.

The control circuit 150 determines Vec by Equation $\{sqrt(X*X+Y*Y)\}$ or Equation $\{sqrt(X*X+Y*Y+Z*Z)\}$ (step S701). Next, the control circuit 150 determines whether that State is on (step S702).

In step S702, if it is determined that State is not on (NO in step S702), the control circuit 150 proceeds to step S703. In contrast, if it is determined in step S702 that State is on (YES in step S702), the control circuit 150 proceeds to step S709.

In step S703, the control circuit 150 determines whether the condition {Vec+Margin1<On_th} is satisfied. Margin1 is a determination value that is used to determine that the user operation is on based on the smallest value obtained when the user operation is off. Preferably, Margin1 is a constant of an extent to which a measurement error occurs when there is no input for a while.

In step S703, if it is determined that the condition {Vec+Margin1<On_th} is satisfied (YES in step S703), the control circuit 150 assigns Vec+Margin1 to On_th (step S704). Then, the control circuit 150 proceeds to step S705.

In contrast, if it is determined in step S703 that the condition {Vec+Margin1<On_th} is not satisfied (NO in step S703), the control circuit 150 proceeds to step S705.

In step S705, the control circuit 150 determines whether the condition {Vec>On_th} is satisfied.

If it is determined in step S705 that the condition {Vec>On_th} is not satisfied (NO in step S705), the control circuit 150 terminates the series of processes illustrated in FIG. 7.

In contrast, in step S705, if it is determined that the condition {Vec>On_th} is satisfied (YES in step S705), the control circuit 150 assigns on to State (step S706). Further, the control circuit 150 detects the tap operation (step S707). Then, the control circuit 150 performs a predetermined initialization process (which will be described below in detail with reference to FIG. 8) (step S708). Thereafter, the control circuit 150 terminates the series of processes illustrated in FIG. 7.

In step S709, the control circuit 150 determines whether the condition {Valley<Peak*0.5} is satisfied. Valley is a minimum value of the vector.

If it is determined in step S709 that the condition {Valley<Peak*0.5} is not satisfied (NO in step S709), the control circuit 150 proceeds to step S711.

If it is determined in step S709 that the condition {Valley<Peak*0.5} is satisfied (YES in step S709), the control circuit 150 determines whether the condition {Vec>Valley+Margin2} is satisfied (step S710). Margin2 is a determination value that is used to determine to reverse direction from the minimum value of the vector when the user operation is on. Preferably, Margin2 is a constant of an extent to which a measurement error occurs immediately after the input.

In step S710, if it is determined that the condition {Vec>Valley+Margin2} is satisfied (YES in step S710), the control circuit 150 detects the tap operation (step S707). Then, the control circuit 150 performs the predetermined initialization process (which will be described in detail with reference to FIG. 8) (step S708). Thereafter, the control circuit 150 terminates the series of processes illustrated in FIG. 7.

In step S710, if it is determined that the condition {Vec>Valley+Margin2} is not satisfied (NO in step S710), the control circuit 150 proceeds to step S711.

In step S711, the control circuit 150 determines whether to satisfy the condition {Vec>Peak}. If it is determined in step S711 that the condition {Vec>Peak} is satisfied (YES in step S711), the control circuit 150 performs the predetermined initialization process (described in detail with reference to FIG. 8) (step S708). Thereafter, the control circuit 150 terminates the series of processes illustrated in FIG. 7.

If it is determined in step S711 that the condition {Vec>Peak} is not satisfied (NO in step S711), the control circuit 150 determines whether the condition {Vec<Valley} is satisfied (step S712).

If it is determined in step S712 that the condition {Vec<Valley} is not satisfied (NO in step S712), the control circuit 150 terminates the series of processes illustrated in FIG. 7.

In step S712, if it is determined that the condition {Vec<Valley} (YES in step S712), the control circuit 150 assigns Vec to Valley (step S713). Further, the control circuit 150 determines whether the condition {Vec<Off_th} is satisfied (step S714).

In step S714, if it is determined that the condition {Vec<Off_th} is not satisfied (NO in step S714), the control circuit 150 terminates the series of processes illustrated in FIG. 7.

In step S714, if it is determined that the condition {Vec<Off_th} is satisfied (YES in step S714), the control circuit 150 assigns off to State (step S715). Further, the control circuit 150 assigns Vec+Margin1 to On_th (step S716). Thereafter, the control circuit 150 terminates the series of processes illustrated in FIG. 7.

According to the series of processes illustrated in FIG. 7, after an on timing at which the operation panel 101 is pressed first is detected, when a change from decreasing to increasing of the vector (Vec) of the strain amount in the strain-generating body 103 is detected (i.e., if it is determined in step S710 that the condition {Vec>Valley+Margin2} is satisfied), the control circuit 150 detects such a change timing of the vector, as a subsequent on timing at which the operation panel 101 is next pressed.

With this approach, the earpiece 100 according to one embodiment can detect both (i) an off timing at which the operation panel 101 that is first pressed is released and (ii) an on timing at which the operation panel 101 is pressed next, at a timing that is earlier than a timing at which the vector of the strain amount in the strain-generating body 103 becomes 0 after the pressed operation panel 101 is actually released. Thus, with use of the earpiece 100 according to one embodiment, each of multiple pressing operations (tap operations) that are continuously performed during a short time period can be detected more reliably.

(Third Example of Process by Control Circuit 150)

Figure 8:
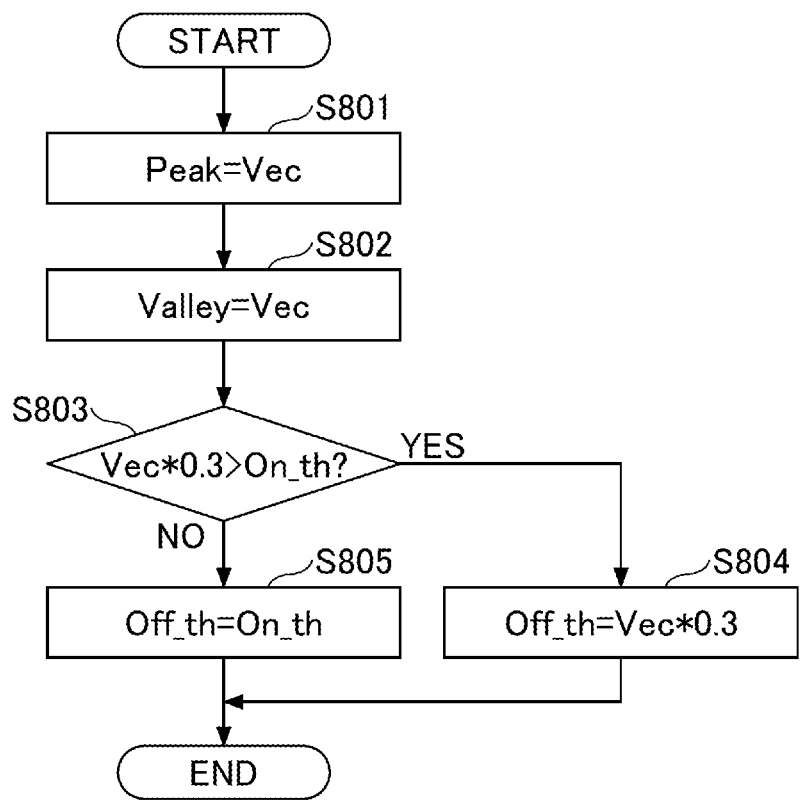
FIG. 8 is a flowchart illustrating a third process example by the control circuit according to one embodiment.

FIG. 8 is a flowchart illustrating a third process example by the control circuit 150 according to one embodiment. The third process example describes a detailed initialization process in step S708 in the flowchart illustrated in FIG. 7.

The control circuit 150 assigns Vec to Peak (step S801). This process is a process, with respect to a first pressing operation, of updating a maximum value, immediately after on, and at the time of updating Peak.

Then, the control circuit 150 assigns Vec to Valley (step S802). This process is a process, with respect to a second pressing operation, of changing a minimum value to a given value (i.e., maximum value) obtained immediately after on, and at the time of updating Peak.

Next, the control circuit 150 determines whether to satisfy the condition {Vec*0.3>On_th} (step S803).

If it is determined in step S803 that the condition {Vec*0.3>On_th} is satisfied (YES in step S803), the control circuit 150 assigns Vec*0.3 to Off_th (step S804). This process is a process, with respect to the first pressing operation, of changing an off threshold used immediately after on, to a value that corresponds to 30% of Peak. Thereafter, the control circuit 150 terminates the series of processes illustrated in FIG. 8.

If it is determined in step S803 that the condition {Vec*0.3>On_th} is not satisfied (NO in step S803), the control circuit 150 assigns On_th to Off_th (step S805). In this process, when a value obtained by multiplying the vector (Vec) of the strain amount in the strain-generating body 103, by a predetermined coefficient (e.g., 0.3) slightly exceeds On_th, Off_th is set to a value that is the same as a value indicating On_th, such that Off_th does not become excessively small. Thereafter, the control circuit 150 terminates the series of processes illustrated in FIG. 8.

(Fourth Example of Process by Control Circuit 150)

Figure 9:
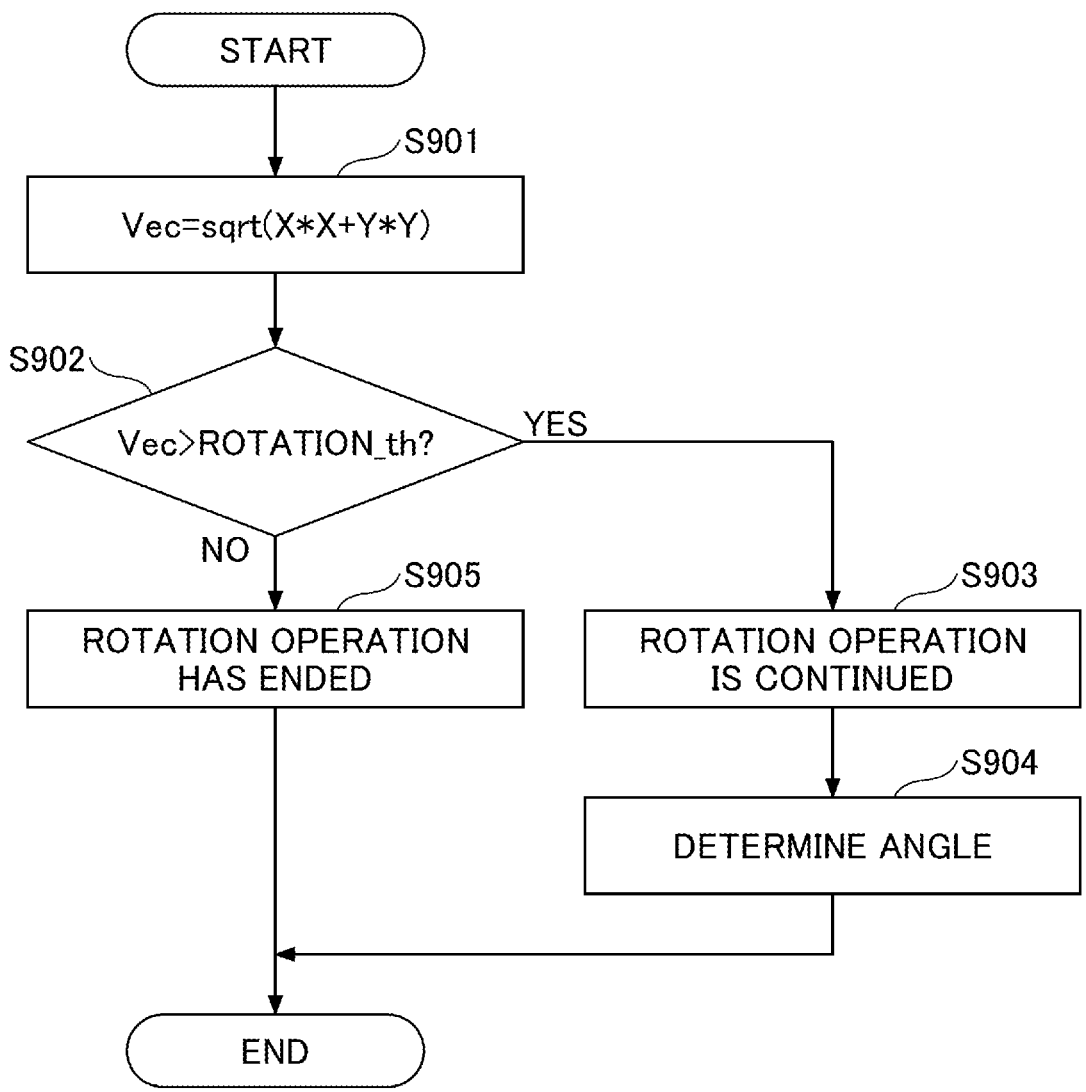
FIG. 9 is a flowchart illustrating a fourth process example by the control circuit according to one embodiment.

FIG. 9 is a flowchart illustrating a fourth process example by the control circuit 150 according to one embodiment. In the fourth process example, the control circuit 150 determines a continuation state in which a rotation operation of the operation panel 101 is performed.

The control circuit 150 determines Vec by Equation {sqrt(X*X+Y*Y)} or Equation {sqrt(X*X+Y*Y+Z*Z)} (step S901). Next, the control circuit 150 determines whether to satisfy the condition {Vec>rotation_th} (step S902). The rotation_th is a threshold used to determine whether the operation panel 101 rotates.

If it is determined in step S902 that the condition {Vec>rotation_th} is satisfied (YES in step S902), the control circuit 150 determines that the rotation operation of the operation panel 101 is continued (step S903). Then, the control circuit 150 determines a rotation angle at which the operation panel 101 is rotated (step S904). For example, the control circuit 150 can determine the rotation angle at which the operation panel 101 is rotated, based on changes in the direction of the vector (Vec) of the strain amount in the strain-generating body 103. Thereafter, the control circuit 150 terminates the series of processes illustrated in FIG. 9.

In step S902, if it is determined that the condition {Vec>rotation_th} is not satisfied (NO in step S902), the control circuit 150 determines that the rotation operation of the operation panel 101 has ended (step S905). Then, the control circuit 150 terminates the series of processes illustrated in FIG. 9.

According to the series of processes illustrated in FIG. 9, in a case where the magnitude of the vector (Vec) of the strain amount in the strain-generating body 103 is maintained above a fixed value (i.e., rotation_th), when changes in the direction of the vector (Vec) of the strain amount in the strain-generating body 103 are detected, the control circuit 150 can determine that the rotation operation of the operation panel 101 has been performed.

With this approach, the earpiece 100 according to one embodiment can detect the rotation operation of the operation panel 101 with high accuracy.

When the control circuit 150 detects a pressing force on the operation panel 101, based on detected strain values by four strain sensors 104D1 to 104D4, and the detected pressing force is maintained at or above a fixed value, in a case where changes in the direction of the vector (Vec) of the strain amount in the strain-generating body 103 are detected, the control circuit 150 may determine that the rotation operation of the operation panel 101 has been performed.

With this arrangement, the earpiece 100 according to one embodiment can detect the rotation operation of the operation panel 101 with high accuracy.

Figure 10:
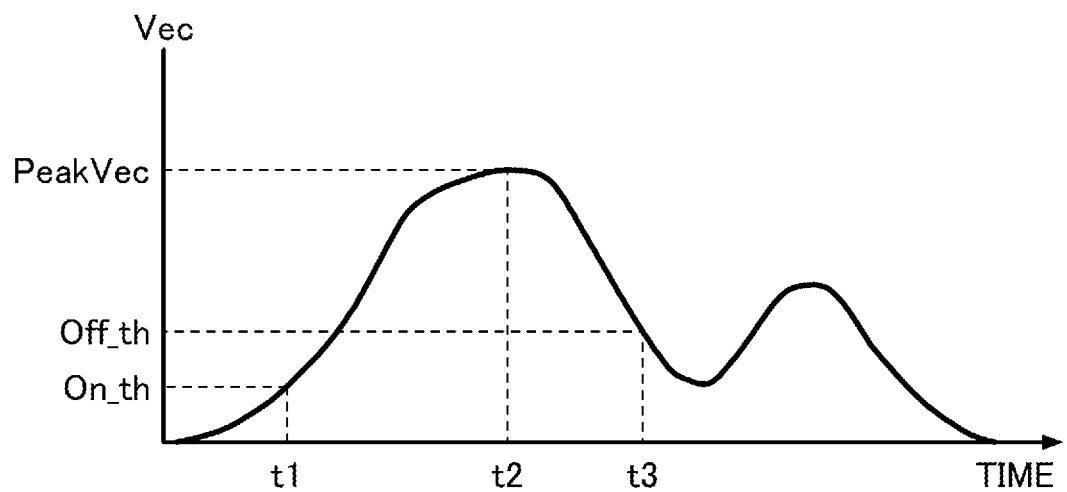
FIG. 10 is a diagram illustrating an example of changes in a vector obtained in the earpiece according to one embodiment.

FIG. 10 is a diagram illustrating an example of changes in a given vector (Vec) obtained in the earpiece 100 according to one embodiment. FIG. 10 illustrates an example in which pressing operations (tap operations) with respect to the operation panel 101 are continuously performed two times. FIG. 10 illustrates an example in which the control circuit 150 executes the series of processes illustrated in FIG. 6.

As illustrated in FIG. 10, by executing the series of processes illustrated in FIG. 6, the control circuit 150 can detect that the pressing operation is first performed at a timing (timing t1) at which the vector (Vec) of the strain amount in the strain-generating body 103 exceeds on_th based on the first pressing operation.

As illustrated in FIG. 10, after (i.e., after a timing t2) the first pressing operation is released, when (i.e., at a timing t3 at which) the vector (Vec) of the strain amount in the strain-generating body 103 is below a value (Off_th) that is obtained by multiplying a peak value (PeakVec) of the vector by a predetermined coefficient (e.g., 0.3), the control circuit 150 can detect that the first pressing operation is released.

As a result, the control circuit 150 can more reliably detect that the pressing operation is next performed subsequently to the first pressing operation.

Figure 11:
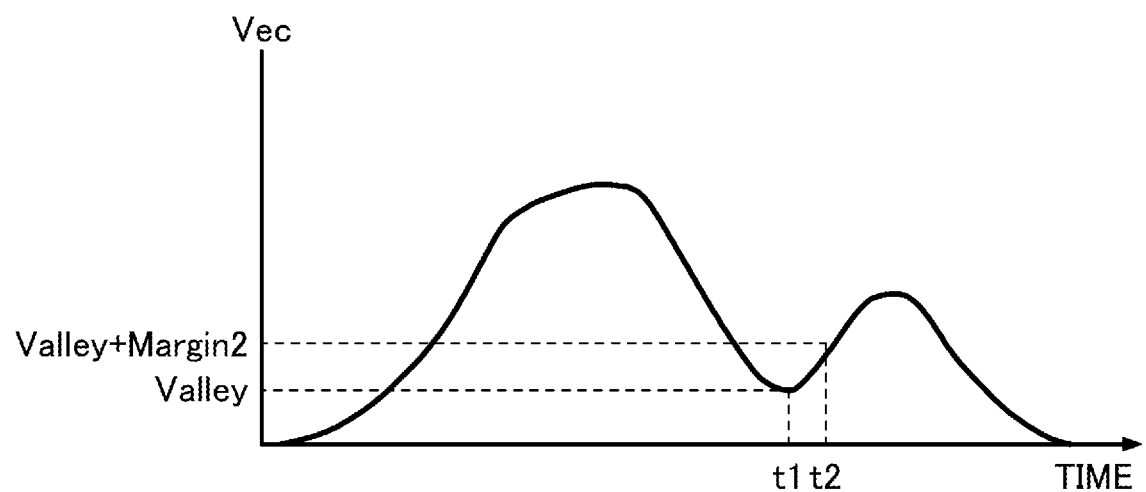
FIG. 11 is a diagram illustrating another example of changes in the vector obtained in the earpiece according to one embodiment.

FIG. 11 is a diagram illustrating another example of changes in the vector (Vec) obtained in the earpiece 100 according to one embodiment. FIG. 11 illustrates an example in which pressing operations (tap operations) with respect to the operation panel 101 are continuously performed two times. FIG. 11 illustrates an example in which the control circuit 150 executes the series of processes illustrated in FIG. 7.

As illustrated in FIG. 11, by executing the series of processes illustrated in FIG. 7, after the first pressing operation is released, when (i.e., at a timing t1 at which) a change from decreasing to increasing of the vector (Vec) of the strain amount in the strain-generating body 103 is detected at the minimum value (Valley), and then an increase amount of the vector (Vec) exceeds a predetermined determination value (Margin2) (see a timing t2), the control circuit 150 can detect that the second pressing operation has been performed.

As a result, the control circuit 150 can more reliably detect the second pressing operation that is performed subsequently to the first pressing operation.

Although the embodiments are described in detail above, the present disclosure is not limited to the embodiments, and various modifications or changes can be made within the scope described in the present disclosure.

What is claimed is:

1. An input device comprising:
a housing;
a strain-generating body including a cylindrical portion with an upper end surface, the strain-generating body being secured to the housing; and
four strain sensors, the four strain sensors being secured around the cylindrical portion of the strain-generating body; and
an operation panel having a lower surface, the operation panel including a shaft, the shaft being situated on the lower surface and at a central portion of the operation panel, and the shaft being inserted into the cylindrical portion of the strain-generating body to be secured to the strain-generating body,
wherein the upper end surface of the cylindrical portion of the strain-generating body and the lower surface of the operation panel are in contact with each other, and
wherein the shaft has a top end that protrudes from the cylindrical portion, and the top end of the shaft faces the housing so as not to contact the housing.

2. The input device according to claim 1,
wherein the strain-generating body includes
four beams, the four beams respectively linearly extending from the cylindrical portion in different four directions, and
an outer peripheral portion connected to outer ends of the four beams, and
wherein the four strain sensors are secured onto the four beams, respectively.

3. The input device according to claim 2, wherein the strain-generating body includes an annular outer peripheral portion, the outer peripheral portion and the cylindrical portion being coupled to each other by the four beams, and the annular outer peripheral portion being screwed and secured to the housing, and
wherein a space is provided between the housing and the strain-generating body at the cylindrical portion and the four beams.

4. The input device according to claim 2, further comprising:
a flexible line board on which the four strain sensors are provided,
wherein the four strain sensors are respectively secured to the four beams, while being secured to the line board.

5. The input device according to claim 1, wherein the lower surface of the operation panel includes a contact surface having an annular shape that surrounds the shaft, the contact surface being offset relative to the lower surface toward the strain-generating body, and the contact surface of the operation panel being in contact with the upper end surface of the cylindrical portion of the strain-generating body, and
wherein the shaft of the operation panel fits the cylindrical portion of the strain-generating body, and
wherein the contact surface of the operation panel has an outer diameter less than an outer diameter of the upper end surface of the cylindrical portion in the strain-generating body.

6. The input device according to claim 1, wherein the operation panel has an outer peripheral edge,
wherein a space is provided between the outer peripheral edge of the operation panel and the housing, and
wherein the outer peripheral edge of the operation panel is configured to contact the housing upon occurrence of a condition in which the operation panel is elastically deformed.

7. The input device according to claim 1, wherein the shaft of the operation panel has a fixed thickness.

8. The input device according to claim 1, wherein the operation panel has an upper surface, and includes a recess at the upper surface and at the central portion.

9. The input device according to claim 1, further comprising a control circuit, the control circuit being configured to
determine a vector of a strain amount in the strain-generating body, based on detected strain values by the four strain sensors, and
detect, based on the vector, (i) a first timing at which the operation panel is pressed and (ii) a second timing at which the pressed operation panel is released,
wherein the control circuit is configured to
determine, as a first threshold, a value that is obtained by multiplying a peak value of the vector by a predetermined coefficient, after the first timing is detected, and
detect, as the second timing, a timing at which the vector is below the first threshold.

10. The input device according to claim 9, wherein the control circuit is configured to detect, as a subsequent first timing, a timing at which a change from decreasing to increasing of the vector is detected after the first timing is detected.

11. The input device according to claim 9, wherein the control circuit is configured to determine that a rotation operation of the operation panel is performed, upon occurrence of a condition in which a magnitude of the vector is maintained above a fixed value, in conjunction with a condition in which a change in a direction of the vector is detected.

12. The input device according to claim 9, wherein the control circuit is configured to
determine a pressing force on the operation panel, based on the detected strain values by the four strain sensors, and
determine that a rotation operation of the operation panel is performed upon occurrence of a condition in which a change in a direction of the vector is detected, in conjunction with a condition in which the pressing force is maintained above a fixed value.

13. The input device according to claim 1, wherein the housing is a housing of an earpiece.

* * * * *